(12) United States Patent
Jaramus et al.

(10) Patent No.: US 10,306,876 B2
(45) Date of Patent: Jun. 4, 2019

(54) MULTI-FUNCTION FISHING TOOL

(71) Applicant: Fiskars Brands, Inc., Middleton, WI (US)

(72) Inventors: Seth Patrick Jaramus, Portland, OR (US); Cheryl Kay Sharp, Portland, OR (US); Gregory Robert Shulman, Tualatin, OR (US)

(73) Assignee: Fiskars Brands, Inc., Middleton, WI (US)

( * ) Notice: Subject to any disclaimer, the term of this patent is extended or adjusted under 35 U.S.C. 154(b) by 52 days.

(21) Appl. No.: 15/564,122

(22) PCT Filed: Jun. 9, 2017

(86) PCT No.: PCT/US2017/036766
§ 371 (c)(1),
(2) Date: Oct. 3, 2017

(87) PCT Pub. No.: WO2017/218340
PCT Pub. Date: Dec. 21, 2017

(65) Prior Publication Data
US 2018/0192626 A1 Jul. 12, 2018

Related U.S. Application Data

(60) Provisional application No. 62/349,405, filed on Jun. 13, 2016.

(51) Int. Cl.
*B25F 1/00* (2006.01)
*B25F 1/04* (2006.01)
(Continued)

(52) U.S. Cl.
CPC ............. *A01K 91/04* (2013.01); *A01K 91/03* (2013.01); *A01K 97/00* (2013.01); *B25F 1/003* (2013.01);
(Continued)

(58) Field of Classification Search
CPC ................................. A01K 91/03; B25F 1/003
(Continued)

(56) References Cited

U.S. PATENT DOCUMENTS 3,521,918 A 7/1970 Hammond
4,029,346 A 6/1977 Browning
(Continued)

OTHER PUBLICATIONS

International Preliminary Report on Patentability for International Application No. PCT/US2017/036766, dated Aug. 24, 2018, 20 pages.
(Continued)

*Primary Examiner* — Hadi Shakeri
(74) *Attorney, Agent, or Firm* — Foley & Lardner LLP

(57) ABSTRACT

A multi-function tool includes a body, a clearing pin fastener, and a line holder assembly. The body includes a through-hole extending from a first surface to a second surface and defined by a threaded sidewall. The clearing pin fastener includes a head, a pointed end portion, and a threaded shank that is located between the head and the pointed end portion. The line holder assembly includes a line holder including a slit formed between a top portion and a bottom portion and configured to receive a line and a frame including a pair of opposing surfaces configured to hold the line holder in compression. The threaded shank is removably attached to the threaded sidewall so that the head is adjacent the first surface and the pointed end portion extends outward from the second surface. The line holder assembly is configured to rotate relative to the body about a pivoting axis.

14 Claims, 3 Drawing Sheets

(51) Int. Cl.
  *A01K 91/04* (2006.01)
  *A01K 97/00* (2006.01)
  *A01K 91/03* (2006.01)
  *A45F 5/02* (2006.01)
  *A45F 5/00* (2006.01)

(52) U.S. Cl.
  CPC *B25F 1/04* (2013.01); *A45F 5/02* (2013.01); *A45F 2005/006* (2013.01)

(58) Field of Classification Search
  USPC .............................................................. 7/106
  See application file for complete search history.

(56) References Cited

U.S. PATENT DOCUMENTS

| | | | |
|---|---|---|---|
| 4,188,052 A | | 2/1980 | Browning |
| 4,403,797 A | | 9/1983 | Ragland, Jr. |
| 4,899,482 A | * | 2/1990 | Gerdes ................... A01K 97/00 43/4 |
| 5,062,192 A | | 11/1991 | Sawyer et al. |
| 5,299,860 A | | 4/1994 | Anderson |
| 5,352,229 A | * | 10/1994 | Goble ................ A61B 17/0642 606/220 |
| 5,685,037 A | | 11/1997 | Fitzner et al. |
| 5,850,649 A | * | 12/1998 | Simpson ................ A01K 97/00 7/106 |
| 6,418,658 B1 | | 7/2002 | Knickrehm |
| 8,225,465 B2 | | 7/2012 | Honeycutt |
| 8,511,721 B1 | | 8/2013 | Farner et al. |
| 8,511,722 B1 | | 8/2013 | Farner et al. |
| 2002/0139035 A1 | | 10/2002 | King et al. |
| 2012/0055962 A1 | | 3/2012 | Lee et al. |
| 2014/0075680 A1 | | 3/2014 | Mariotti |
| 2015/0264908 A1 | | 9/2015 | Banda |
| 2015/0327528 A1 | | 11/2015 | O'Neal |
| 2018/0177173 A1 | * | 6/2018 | Lohmiller ............... A01K 95/02 |

OTHER PUBLICATIONS

International Search Report and Written Opinion, PCT/US2017/036766, Fiskars Brands, Inc., 7 pages (dated Sep. 11, 2017).

\* cited by examiner

MULTI-FUNCTION FISHING TOOL

CROSS-REFERENCE TO RELATED PATENT APPLICATIONS

This application is a U.S. National Stage Application of PCT/US2017/036766, filed Jun. 9, 2017, which claims the benefit of and priority to U.S. Provisional Patent Application No. 62/349,405, filed Jun. 13, 2016, the entire contents of each of which are incorporated herein by reference in their entireties.

BACKGROUND

The present application relates generally to the field of multi-function tools. Multi-function tools typically include a pair of handles or jaws and an implement such as a pliers and cutters, along with any number of other ancillary tools. When tying or knotting a fishing line, the loose end of the line is often dropped or otherwise falls away. Because the fishing line is often small and difficult to see, it can be tedious for a user to search out the line when lost. Conventional tools do not provide a line holder to secure the line while the user is busy performing other tasks.

Additionally, on conventional multi-function tools, hook clearing pins are not conveniently located and/or the user may desire to change the location of the clearing pin, but may not be able to do so. Furthermore, on typical tools, hook clearing pins become dulled or damaged and cannot be replaced without replacing the entire multi-function tool.

SUMMARY

One embodiment relates to a multi-function tool including a body, a clearing pin fastener, and a line holder assembly. The body includes a first surface, a second surface, and a through-hole extending from the first surface to the second surface and defined at least in part by a threaded sidewall. The clearing pin fastener includes a head, a pointed end portion, and a threaded shank located between the head and the pointed end portion. The line holder assembly includes a line holder including a slit formed between a top portion and a bottom portion and configured to receive a line and a frame including a pair of opposing surfaces configured to hold the line holder in compression. The threaded shank is removably attached to the threaded sidewall so that the head is adjacent the first surface and the pointed end portion extends outward from the second surface. The line holder assembly is configured to rotate relative to the body about a pivoting axis.

Another embodiment relates to a multi-function tool including a body and a clearing pin. The body includes a first surface, a second surface, and a through-hole extending from the first surface to the second surface and defined at least in part by a threaded sidewall. The clearing pin fastener includes a head, a pointed end portion, and a threaded shank located between the head and the pointed end portion. In a first configuration, the threaded shank is removably attached to the threaded sidewall so that the head is adjacent the first surface and the pointed end portion extends outward from the second surface.

Yet another embodiment relates to a multi-function tool including a tool and a line holder assembly. The line holder assembly includes a line holder including a slit formed between a top portion and a bottom portion and configured to receive a line and a frame including a pair of opposing surfaces configured to hold the line holder in compression. The line holder assembly is configured to rotate relative to the tool about a pivoting axis.

The invention is capable of other embodiments and of being practiced or being carried out in various ways. It is to be understood that the invention is not limited in its application to the details of construction and the arrangements of components set forth in the following description or illustrated in the drawings. Alternative exemplary embodiments relate to other features and combinations of features as may be generally recited in the claims.

DETAILED DESCRIPTION

Figure 1:
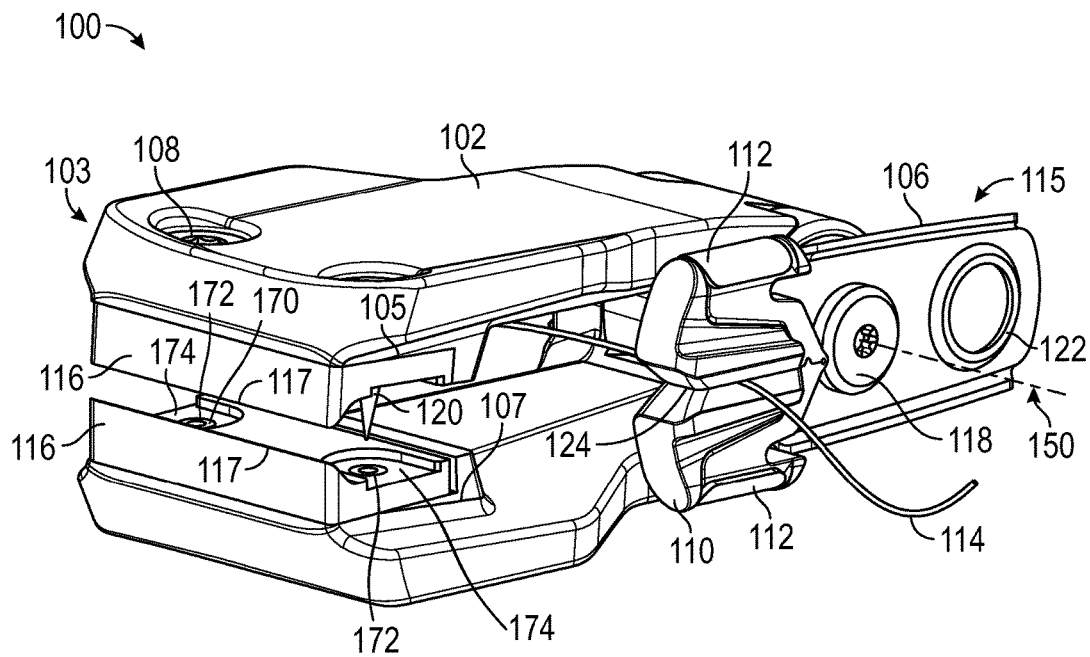
FIG. 1 is a perspective view of multi-functional nippers, according to an exemplary embodiment.
Figure 2:
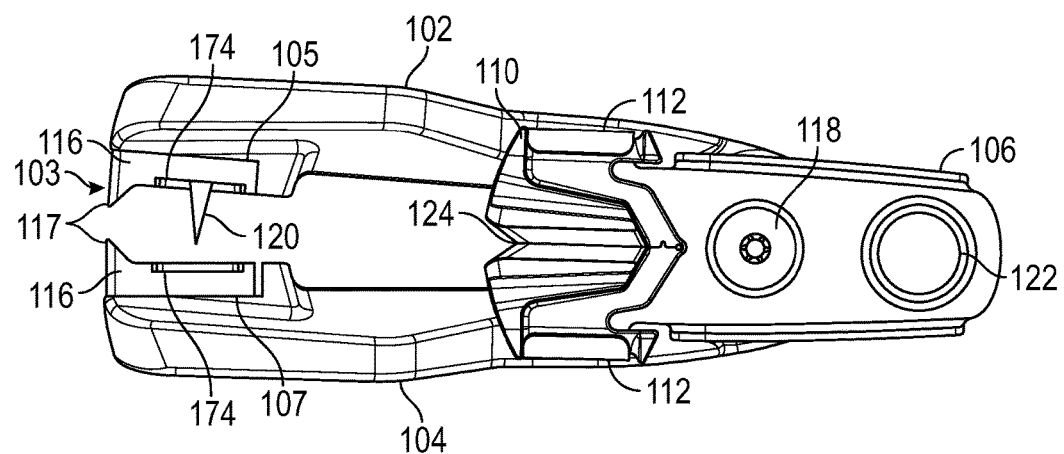
FIG. 2 is a right side view of the multi-functional nippers of FIG. 1, according to an exemplary embodiment.
Figure 3:
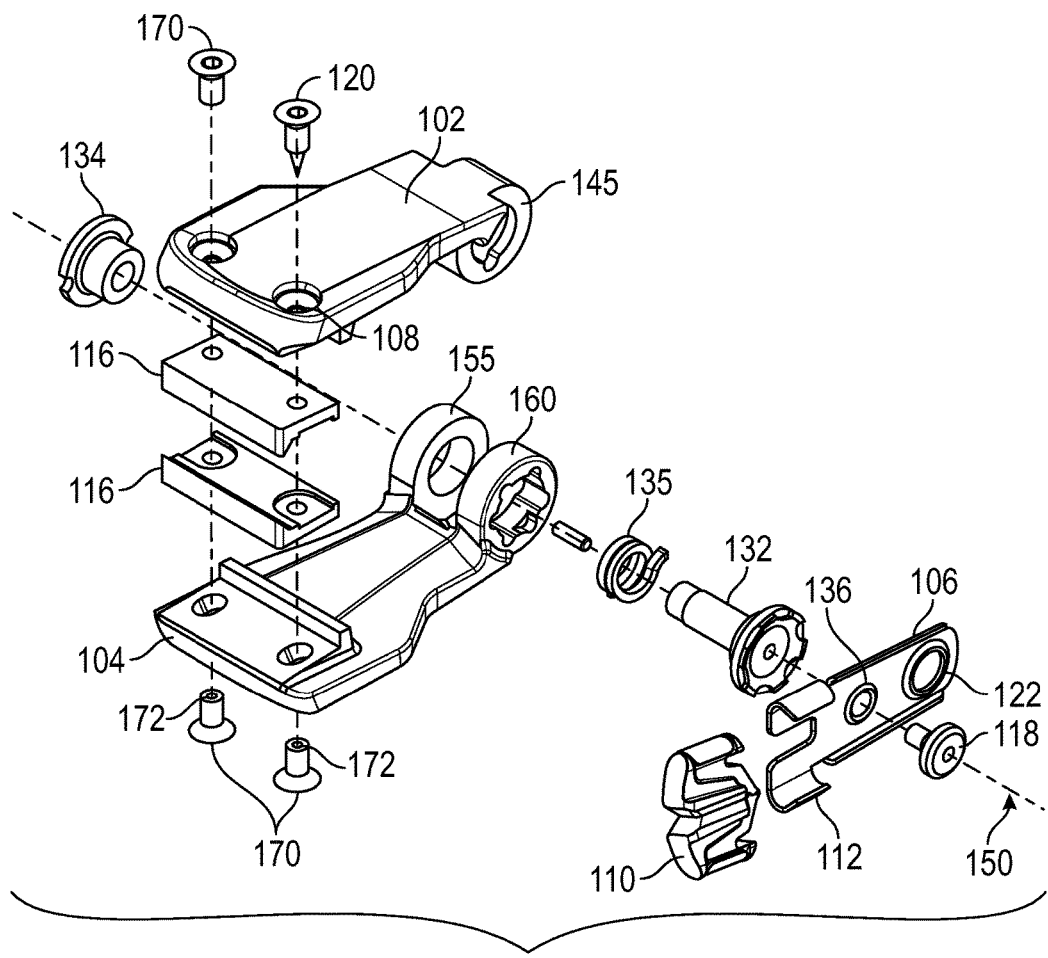
FIG. 3 is an exploded view of the multi-functional nippers of FIG. 1, according to an exemplary embodiment.

Referring to FIGS. 1-3, a multi-functional tool, shown and described as nippers 100, is shown according to an exemplary embodiment. The multi-functional nippers 100 are shown as having a first jaw 102 and a second jaw 104. The first jaw 102 includes a first mating feature 145. The second jaw 104 includes at least one second mating feature 155. In one embodiment as shown in FIG. 3, the second jaw 104 includes a second mating feature 155 and a third mating feature 160. In other embodiments, the first jaw 102 and the second jaw 104 can include any number of mating features. The first mating feature 145 of the first jaw 102 is configured to be positioned between the second and third mating features 155, 160 of the second jaw 104 along a pivoting axis 150 when the first jaw 102 is connected to the second jaw 104. The first and second jaws 102, 104 are pivotally connected at the pivoting axis 150 such that a user can pivot the jaws 102, 104 toward each other to close a cutting end 103 of the jaws 102, 104. The first and second jaws 102, 104 are biased away from one another by a biasing member, shown as spring 135. As shown in FIG. 3, in some embodiments, the first and second jaws 102, 104 are pivotally connected using a male axle 132 and a female axle 134 inserted into the through-holes formed on the mating features 145, 155, 160. In other embodiments, the first and second jaws 102, 104 can be pivotally connected using other suitable mechanisms.

The first jaw 102 includes a first inner surface 105 and the second jaw includes a second inner surface 107. As shown in FIGS. 1-2, the nippers 100 additionally include cutters, shown as cutting inserts 116, attached to the cutting end 103 on the inside surfaces 105, 107 of the jaws 102, 104. In some embodiments, the cutters 116 are configured to cut a fishing line. When the jaws 102, 104 are pivotally rotated by a user to close the cutting end 103, the cutting edges 117 of each cutter 116 come together to cut an item positioned in between the cutting edges 117. In one embodiment, the cutters 116 are attached to the nippers 100 using general purpose fasteners at each fastener location 108. In the embodiment shown in FIGS. 1-3, the nippers 100 include four fastener locations 108. In other embodiments, the nippers 100 can include more or less than four fastener locations 108. In some embodiments, one of the fasteners includes a clearing pin 120, as will be discussed further herein.

Figure 4:
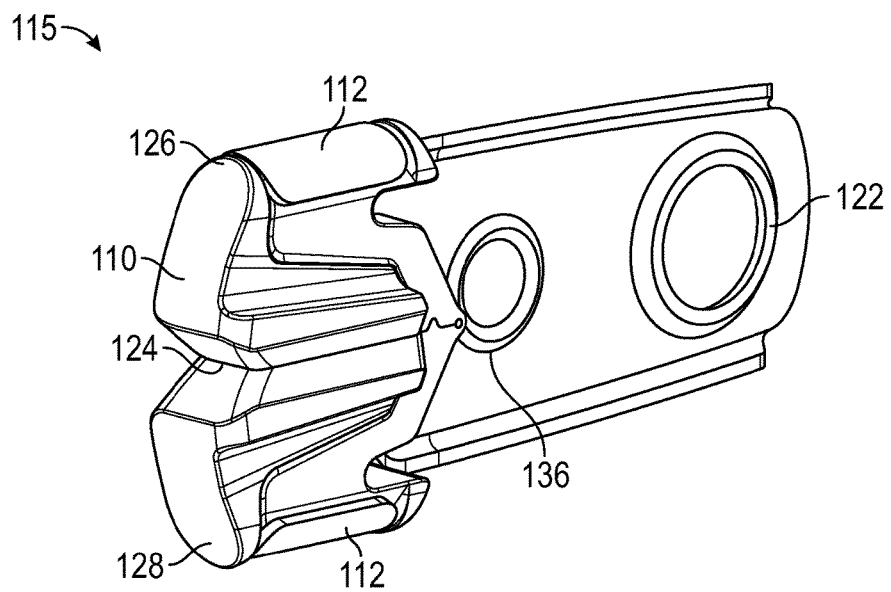
FIG. 4 is a perspective view of a line holder and frame of the multi-functional nippers of FIG. 1, according to an exemplary embodiment.
Figure 5:
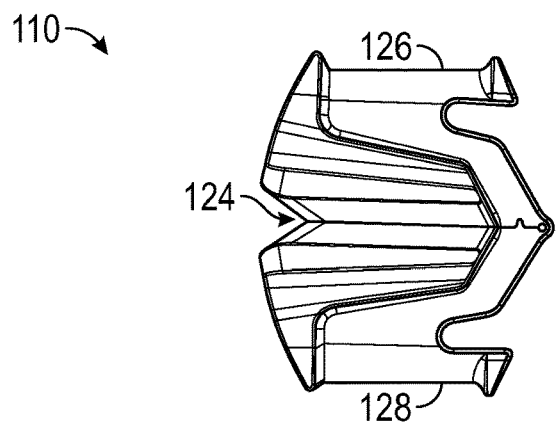
FIG. 5 is a front view of the line holder of FIG. 4, according to an exemplary embodiment.
Figure 6:
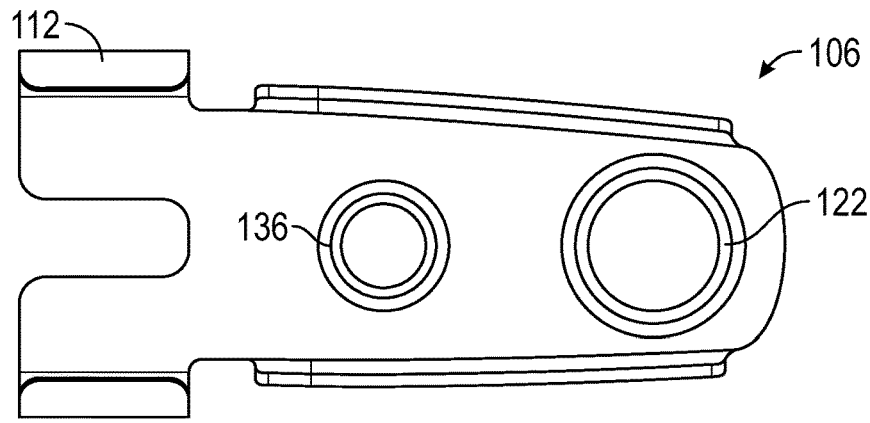
FIG. 6 is a front view of the frame of FIG. 4, according to an exemplary embodiment.

Referring now to FIGS. 4-6, the multi-functional nippers 100 additionally include a line holder assembly 115 including a frame 106 and a line holder 110. The frame 106 includes a first attachment hole 136, a second attachment hole 122, and opposing surfaces 112. In one embodiment, the frame 106 is removably attached at the first attachment hole 136 to the pivoting axis 150 of the nippers 100 using a fastener 118. In other embodiments, using the first attachment hole 136, the frame 106 is configured to attach to other tools including, but not limited to, pliers, fishing rods or reels, scissors, boat or kayak rails, tackle box, tethers, or can be used as a stand-alone tool. Using the second attachment hole 122, the frame 106 is also configured to attach to other items, such as other tools, bags, clothing, and lanyards. The diameter of the first attachment hole 136 is shown as smaller than the diameter of the second attachment hole 122, but the diameter of the first attachment hole 136 may be bigger or the same size as the diameter of the second attachment hole 122.

The opposing surfaces 112 create a space in-between for positioning of the line holder 110 therein. The opposing surfaces 112 are configured to hold the line holder 110 in compression. In one embodiment, the frame 106 is made of a rigid material. In other embodiments, the frame 106 is made of a flexible material.

The line holder 110 comprises a piece of elastomeric material held between the opposing surfaces 112 of the frame 106. As shown in FIGS. 4-5, the line holder 110 includes a top portion 126 and a bottom portion 128. The top portion 126 and bottom portion 128 include a slit 124 therein. In one embodiment, the line holder 110 is configured to hold a fishing line 114 (FIG. 1). As such, the slit 124 is configured to hold the fishing line 114 by compression. The fishing line 114 can be inserted into the slit 124, wherein the elastomeric material allows the fishing line 114 to compress the elastomeric material as inserted and create space for the line 114 in the slit 124 between the top portion 126 and the bottom portion 128. The compression of the top portion 126 and bottom portion 128 holds the line 114 in place, but does not prevent easy removal of the line 114 from the slit 124. In some embodiments, the opposing surfaces 112 of the frame 106 provide additional compression on the top and bottom portions 126, 128 of the line holder 110 to hold the line 114 in place in the slit 124.

Figure 7:
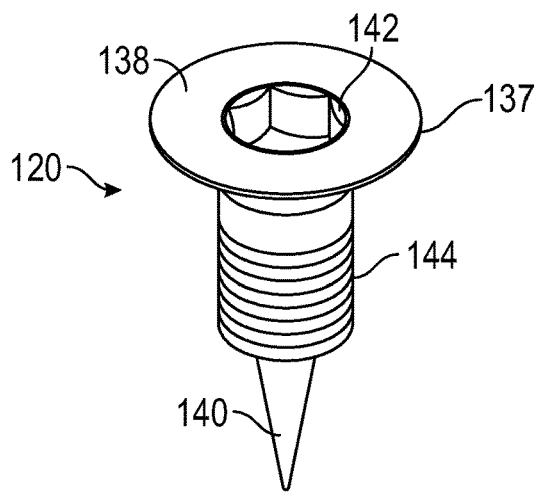
FIG. 7 is a perspective view of the clearing pin of the multi-functional nippers of FIG. 1, according to an exemplary embodiment.
Figure 8:
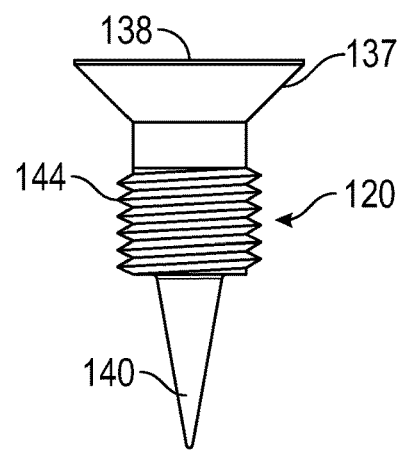
FIG. 8 is a front view of the clearing pin of the multi-functional nippers of FIG. 1, according to an exemplary embodiment.

The multi-functional nippers 100 additionally include a clearing pin 120 shown in FIGS. 7-8. In an exemplary embodiment, the clearing pin 120 is integrally formed with a fastener as a single component as described below. The clearing pin 120 includes a head portion or head 137 defining a top flat surface 138, a middle portion 144, and a pointed end 140. The top flat surface 138 includes an aperture 142 to receive a tool bit or driver (Phillips, hex head/Allen, flat, etc.). The aperture 142 is shown in FIG. 7 as a hex-head or Allen female mating feature. However, in other embodiments, the aperture 142 can include a slit for receiving a flat-head screw driver, a cross-shape for receiving a Phillips-head screw driver, and so on. The aperture 142 extends from the top flat surface 138 to a depth that is suitable for a tool bit or driver to engage the aperture 142. The head 137 may be a different shape or diameter than the middle portion 144 (e.g., a cap screw head, a countersunk head, a button head, etc.) or may be similar in shape and/or diameter to the middle portion 144 (e.g., a setscrew).

In one embodiment, the middle portion 144 includes a threaded portion and a shank portion (e.g., unthreaded portion). The threaded portion and shank portion can be of any length suitable and the thread dimensions can be of any dimension/depth suitable. In other embodiments, the middle portion 144 is threaded along the entire length of the middle portion 144. In other embodiments, the middle portion 144 is not threaded. In some embodiments, the through-hole wall of the fastener location 108 is threaded to receive the middle portion 144 therein. In some embodiments, the middle portion 144 can extend the same length as the through-hole of fastener location 108. In other embodiments, the middle portion 144 is longer than the through-hole of fastener location 108.

As shown in FIGS. 7-8, in one embodiment, the pointed end 140 is a conical shape starting at the bottom end of the middle portion 144 and ending in a point. In other embodiments, the pointed end 140 is any other shape ending in a point. The pointed end 140 is unthreaded.

The clearing pin 120 is configured to clear the eyelet of a fishing hook. The eyelet of a hook, which is configured to receive a fishing line 114 therethrough, can be covered with paint when first purchased or can be filled with fish parts after use and it may be difficult for a user to insert a line 114 into the eyelet. The pointed end 140 is configured to be inserted through the eyelet to push any unwanted items out of the eyelet.

Because the clearing pin 120 is formed on a fastener, the clearing pin 120 can be used as one of the several fasteners to couple the cutters 116 to the jaws 102, 104. In other embodiments, the clearing pin 120 is not used to couple anything to a tool and can be used as the only feature on a tool or as a separate feature on a tool. As such, the clearing pin 120 can be used on any fishing tool, including, but not limited to, a line clipper, pliers, multi-tool, wrench, fishing rod, fishing reel, scissors, tackle boxes including lure boxes and pocket boxes, knife handles, knife sheathes, tool sheathes, tethers including the tether cord or body and the tether clip or fastener, knot tying tools, pens and other writing instruments including styluses, fish hammers and other bludgeoning devices, clamps, forceps, hemostats, rulers, tape measurers, hook removers, rod or reel protectors, lippers, grippers, other fish grip tools, coolers, scales, line winders, line cutters, snips, bottle openers, knife sharpeners, hook sharpeners, fly-tying vices, boat rails, canoe or kayak attachment/accessory rails, rod holders, net hinges, boot spikes, wearables including gloves, vests, and bracelets, and lanyard clips.

The clearing pin 120 is inserted on the jaws 102, 104 with the pointed end 140 toward the inside surfaces 105, 107, such that the pointed end 140 is contained within the space between the jaws 102, 104 and the flat surface 138 is positioned on the outside of the jaws 102, 104. The pointed end 140 extends past the inner surfaces 105, 107 when inserted into the tool 100. For example and as shown in FIG. 2, when the clearing pin 120 is used in a fastener location on the first jaw 102, the pointed end 140 extends past the inner surface 105 to be positioned between the inner surfaces 105 and 107. When the clearing pin 120 is used in a fastener location 108 on the second jaw 104, the pointed end 140 extends past the inner surface 107 to be positioned between the inner surfaces 105 and 107. The clearing pin 120 can be inserted into any of the fastener locations 108 such that the clearing pin 120 is interchangeable with other fasteners 170 and can be moved between the fastener locations 108. As shown in FIGS. 1 and 3, in one embodiment, there are four fastener locations 108 such that the clearing pin 120 can be moved between four different locations. As noted above, there may be more or less fastener locations 108 that the clearing pin 120 may be moved between. In some embodiments, there are multiple clearing pins 120. The clearing pin 120 can also be replaced with a replacement clearing pin when the clearing pin 120 becomes dulled or damaged without disassembling any other portion of the nippers 100.

The fasteners 170 extend through the through holes of the fastener locations 108 that are not occupied by the clearing pin 120. The fasteners 130 couple the cutting inserts 116 to the first jaw 102 and the second jaw 104. In some embodiments, one of the fastener locations 108 in the first jaw 102 is aligned with one of the fastener locations in the second jaw 104. In some such embodiments, an aperture 172 extends through a portion of the fastener 170 such that the aperture 172 receives the pointed end 140 of the clearing pin 120 when the first jaw 102 and the second jaw 104 are rotated towards one another. When clearing an eyelet of a fish hook, the fish hook can be pressed against the fastener 130 and/or the cutting insert 116, and the pointed end 140 can extend through and beyond the eyelet to ensure that the eyelet is fully cleared. In some embodiments, the cutting insert 116 defines a depression 174 extending from a top surface and a side surface of the cutting insert 116 and surrounding a fastener location 108. The depression 174 receives the eyelet and may facilitate alignment of the eyelet with the pointed end 140.

It is important to note that the construction and arrangement of the multi-functional nippers as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. While the detailed drawings, specific examples, and particular formulations given describe certain exemplary embodiments, they serve the purpose as illustration only. The invention is not limited to the specific forms shown. The configuration of multi-function tool may differ depending on chosen performance characteristics and physical characteristics of the components of the multi-function tool. For example, the implement may take a variety of configurations and perform different functions depending on the needs of the user. Furthermore, other substitutions, modifications, changes, and omissions may be made in the design, operating conditions, and arrangement of the exemplary embodiments without departing from the scope of the invention as expressed in the appended claims. Elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present invention.

What is claimed is:

1. A multi-function tool, comprising:
    a body comprising a first surface, a second surface, and a through-hole extending from the first surface to the second surface, wherein the through-hole is defined at least in part by a threaded sidewall;
    a clearing pin fastener including a head, a threaded shank, and a pointed end portion, wherein the threaded shank is located between the head and the pointed end portion;
    and a line holder assembly, comprising:
        a line holder, comprising:
            a top portion;
            a bottom portion; and
            a slit formed between the top portion and the bottom portion and configured to receive a line; and
        a frame comprising a pair of opposing surfaces configured to hold the line holder in compression;
    wherein the threaded shank is removably attached to the threaded sidewall so that the head is adjacent the first surface and the pointed end portion extends outward from the second surface; and
    wherein the line holder assembly is configured to rotate relative to the body about a pivoting axis.

2. The multi-function tool of claim 1, wherein the body comprises a plurality of through-holes, wherein each of the plurality of through-holes is defined at least in part by a threaded side-wall, and wherein the threaded shank is configured to be removably attached to any of the threaded side-walls such that the clearing pin fastener can be removed and replaced in any of the plurality of through-holes.

3. The multi-function tool of claim 1, wherein the clearing pin fastener is formed as a single integral component.

4. The multi-function tool of claim 1, wherein the frame further comprises a first attachment hole, wherein the frame is configured to attach to the body at the first attachment hole, and wherein the pivoting axis extends through the first attachment hole.

5. The multi-function tool of claim 4, wherein the frame further comprises a second attachment hole configured to removably attach the frame to at least one of a lanyard, a piece of clothing, and a bag.

6. The multi-function tool of claim 1, wherein the line holder is made of an elastomeric material.

7. The multi-function tool of claim 1, wherein the body comprises at least one of a line clipper, pliers, a multi-tool, a wrench, a fishing rod, and a fishing reel.

8. A multi-function tool, comprising:
    a body comprising a first surface, a second surface, and a through-hole extending from the first surface to the second surface, wherein the through-hole is defined at least in part by a threaded sidewall; and
    a clearing pin fastener including a head, a threaded shank, and a pointed end portion, wherein the threaded shank is located between the head and the pointed end portion;
    wherein in a first configuration, the threaded shank is removably attached to the threaded sidewall so that the head is adjacent the first surface and the pointed end portion extends outward from the second surface;
    wherein the body is a first jaw including a first cutting insert, wherein the through-hole is a first through-hole extending through the first jaw and the first cutting insert, and wherein the multi-function tool further comprises a second jaw and a second cutting insert;

wherein the first jaw is pivotally coupled to the second jaw at a pivoting axis, wherein the first jaw and the second jaw are configured to move between an open position and a closed position relative to each other, wherein the first jaw includes a first cutting end and the second jaw includes a second cutting end;

wherein the first cutting insert is configured to attach to the first jaw at the first cutting end; and wherein the second cutting insert is configured to attach to the second jaw at the second cutting end and wherein the second cutting insert includes a second through-hole.

9. The multi-function tool of claim 8, wherein in the first configuration, the clearing pin fastener is configured to removably attach the first cutting insert to the first jaw at the first through-hole.

10. The multi-function tool of claim 9, wherein in a second configuration, the clearing pin fastener is configured to removably attach the second cutting insert to the second jaw at the second through-hole.

11. The multi-function tool of claim 10, wherein the first cutting insert further includes a third through-hole, wherein in a third configuration, the clearing pin fastener is configured to removably attach the first cutting insert to the first jaw at the third through-hole.

12. The multi-function tool of claim 11, wherein the second cutting insert further includes a fourth through-hole, wherein in a fourth configuration, the clearing pin fastener is configured to removably attach the second cutting insert to the second jaw at the fourth through-hole.

13. The multi-function tool of claim 8, wherein the clearing pin fastener is formed as a single integral component.

14. The multi-function tool of claim 8, wherein a threaded length of the threaded shank is the same as a length of the through-hole.

* * * * *